(12) United States Patent
Li

(10) Patent No.: US 9,645,297 B2
(45) Date of Patent: May 9, 2017

(54) BACKLIGHT MODULE AND LIQUID CRYSTAL DISPLAY COMPRISING LIGHT CONVERSION UNIT

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/116,131

(22) PCT Filed: Oct. 15, 2013

(86) PCT No.: PCT/CN2013/085240
§ 371 (c)(1),
(2) Date: Nov. 7, 2013

(87) PCT Pub. No.: WO2015/051557
PCT Pub. Date: Apr. 16, 2015

(65) Prior Publication Data
US 2015/0103291 A1    Apr. 16, 2015

(51) Int. Cl.
*G02F 1/1335* (2006.01)
*F21V 8/00* (2006.01)

(52) U.S. Cl.
CPC .......... *G02B 6/0023* (2013.01); *G02B 6/0013* (2013.01); *G02B 6/0021* (2013.01);
(Continued)

(58) Field of Classification Search
CPC ......... G02F 1/133615; G02F 1/133621; G02F 2001/133624; G02F 1/133608;
(Continued)

(56) References Cited

U.S. PATENT DOCUMENTS

| 9,298,039 B2* | 3/2016 | Cha ...................... G02B 6/0023 |
| 2012/0075837 A1* | 3/2012 | Um ................................ 362/84 |

(Continued)

FOREIGN PATENT DOCUMENTS

| CN | 102628580 A | 8/2012 |
| CN | 102954408 A | 3/2013 |

*Primary Examiner* — Paisley L Arendt
(74) *Attorney, Agent, or Firm* — Andrew C. Cheng

(57) ABSTRACT

A backlight module and a liquid crystal display are disclosed. The backlight module includes a light guiding plate having at least one light incident surface, a light source unit being arranged close to the light incident surface, and a light conversion unit being fixed between the light source unit and the light incident surface. The light conversion unit converts light beams emitted from the light source unit to white light beams. The light conversion unit is a complex fluorescent material bar of quantum dots having a plurality of fluorescent quantum dots, and the light beams emitted from the activated fluorescent quantum dots are composited with the light beams emitted from the light conversion unit to generate white light beams. The fixing process of the complex fluorescent material bar is simplified. In addition, by utilizing the quantum effects, the NTSC value of the backlight module is greatly enhanced.

6 Claims, 3 Drawing Sheets

(52) U.S. Cl.
CPC .. *G02F 1/133608* (2013.01); *G02F 1/133609* (2013.01); *G02F 1/133615* (2013.01); *G02F 2001/133614* (2013.01)

(58) Field of Classification Search
CPC ... G02F 1/133609; G02F 2001/133614; G02B 6/0073; G02B 6/0026; G02B 6/009; G02B 6/0013; G02B 6/0021
See application file for complete search history.

(56) References Cited

U.S. PATENT DOCUMENTS

2013/0050612 A1\* 2/2013 Hur et al. .................... 349/62
2013/0271700 A1\* 10/2013 Nakamura et al. ............ 349/65

\* cited by examiner

BACKLIGHT MODULE AND LIQUID CRYSTAL DISPLAY COMPRISING LIGHT CONVERSION UNIT

BACKGROUND OF THE INVENTION

1. Field of the Invention

The present disclosure relates to liquid crystal display technology, and more particularly to a backlight module and a liquid crystal display (LCD).

2. Discussion of the Related Art

LCDs are characterized by attributes such as thinner, power-saving, low radiation, and the emitted soft lights are not harm to human eyes, and thus are greatly adopted. The LCD mainly includes a liquid crystal panel and a backlight module opposite to the liquid crystal panel. In addition, the backlight module provides a light source for the liquid crystal panel such that the liquid crystal panel can display images via the light beams emitted from the light source.

Currently, the backlight modules mainly include direct back-lit and edge back-lit. However, for the above-mentioned backlight modules, white lights are needed to operate as a backlight source. However, generally, white-light backlight source usually adopts blue light emitting diode (LED) to activate yellow phosphors to generate the white lights, and the color saturation (NTSC) is in a range from 60% to 80%.

In order to increase the NTSC value of the white lights generated by the yellow phosphors activated by the blue LED, currently, blue LEDs are adopted to activate Nano-scale quantum dots of the yellow phosphors. With the quantum effect, the NTSC value of the white lights generated by the yellow phosphors activated by the blue LED can be above 100% such that the display performance is enhanced. In order to protect the quantum dots, generally, quantum bars are adopted to receive the quantum dots. However, the fixing of the quantum bar is an urgent problem.

SUMMARY

In one aspect, a backlight module includes: a light guiding plate including at least one light incident surface; a light source unit being arranged close to the light incident surface; and a light conversion unit being fixed between the light source unit and the light incident surface, and the light conversion unit converts light beams emitted from the light source unit to white light beams.

In another aspect, a liquid crystal display includes: a liquid crystal panel and a backlight module arranged opposite to the liquid crystal panel, the backlight module provides a light source for the liquid crystal panel such that the liquid crystal panel is capable of displaying images, the backlight module includes: a light guiding plate including at least one light incident surface; a light source unit being arranged close to the light incident surface; and a light conversion unit being fixed between the light source unit and the light incident surface, and the light conversion unit converts light beams emitted from the light source unit to white light beams.

Wherein the light conversion unit is a complex fluorescent material bar of quantum dots including a plurality of fluorescent quantum dots, and the light beams emitted from the activated fluorescent quantum dots are composited with the light beams emitted from the light conversion unit to generate white light beams.

Wherein the light source unit includes a plurality of blue LEDs or purple LEDs.

Wherein the fluorescent quantum dots cooperating with the blue LEDs are fluorescent quantum dots emitting yellow or red light beams, emitting yellow light beams or emitting yellow-green light beams.

Wherein the fluorescent quantum dots cooperating with the purple LEDs are fluorescent quantum dots emitting blue light beams, mixed quantum dots emitting red light beams and emitting green light beams, or fluorescent quantum dots emitting blue or yellow light beams.

Wherein the complex fluorescent material bar of quantum dots includes a plurality of fixing legs arranged respectively at two lateral sides along a longitudinal direction of the complex fluorescent material bar of the quantum dots, the fixing legs if fixed connected with a substrate of the light source unit to fix the complex fluorescent material bar of the quantum dots such that the complex fluorescent material bar of quantum dots is fixed between the light source unit and the light incident surface.

Wherein the backlight module further includes a first fixing frame having a first holding sheet, a first connecting portion, and a first protrusion arranged between the first holding sheet and the first connecting portion, a first slot is formed between the first protrusion and the first holding sheet, the first connecting portion is fixedly connected with the light emitting surface connecting to the light incident surface and the bottom surface opposite to the light emitting surface of the light guiding plate so as to fix the first frame, and the complex fluorescent material bar of the quantum dots is arranged within the first slot so as to be fixed between the light source unit and the light incident surface.

Wherein the backlight module further includes a second fixing frame including a second holding sheet, a second connecting portion, and a second protrusion arranged between the second holding sheet and the second connecting portion, a second slot is formed between the second protrusion and the second holding sheet, the second connecting portion is fixedly connected with a substrate of the light source unit to fix the second fixing frame, and the complex fluorescent material bar of the quantum dots is arranged within the second slot so as to be fixed between the light source unit and the light incident surface.

Wherein the backlight module further includes a third fixing frame, the third fixing frame includes a third holding sheet and a third connecting portion connecting to the third holding sheet, the third connecting portion is fixed is fixedly connected with the light emitting surface connecting to the light emitting surface and the bottom surface opposite to the light emitting surface of the light guiding plate to form a third slot, the complex fluorescent material bar of quantum dots is arranged within the third slot so as to be fixed between the light source unit and the light incident surface.

Wherein the complex fluorescent material bar of quantum dots includes a boss arranged within the second slot formed between the two third holding sheets.

The fixing process of the complex fluorescent material bar of the quantum dots is simplified. In addition, by utilizing the quantum effects, the NTSC value of the backlight module is greatly enhanced.

DETAILED DESCRIPTION OF THE EMBODIMENTS

Figure 1:
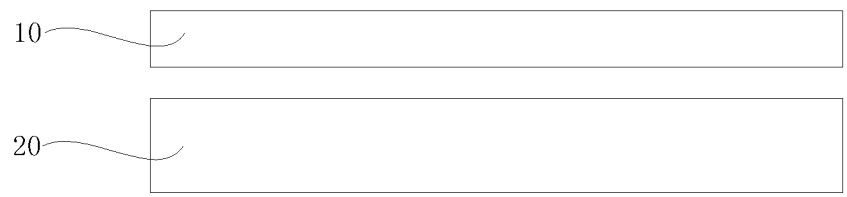
FIG. 1 is a schematic view of the liquid crystal display in accordance with one embodiment.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

FIG. 1 is a schematic view of the liquid crystal display in accordance with one embodiment.

The liquid crystal display includes a liquid crystal panel 10 and a backlight module 20 opposite to the liquid crystal panel 10. The backlight module 20 provides a display light source to the liquid crystal panel 10 such that the liquid crystal panel 10 is capable of displaying images by the light beams provided by the backlight module 20. In one embodiment, the liquid crystal panel 10 is a liquid crystal panel incorporating with current technology and thus the corresponding description is omitted hereinafter.

The backlight module 20 will be described in detail hereinafter with a plurality of embodiments.

Figure 2:
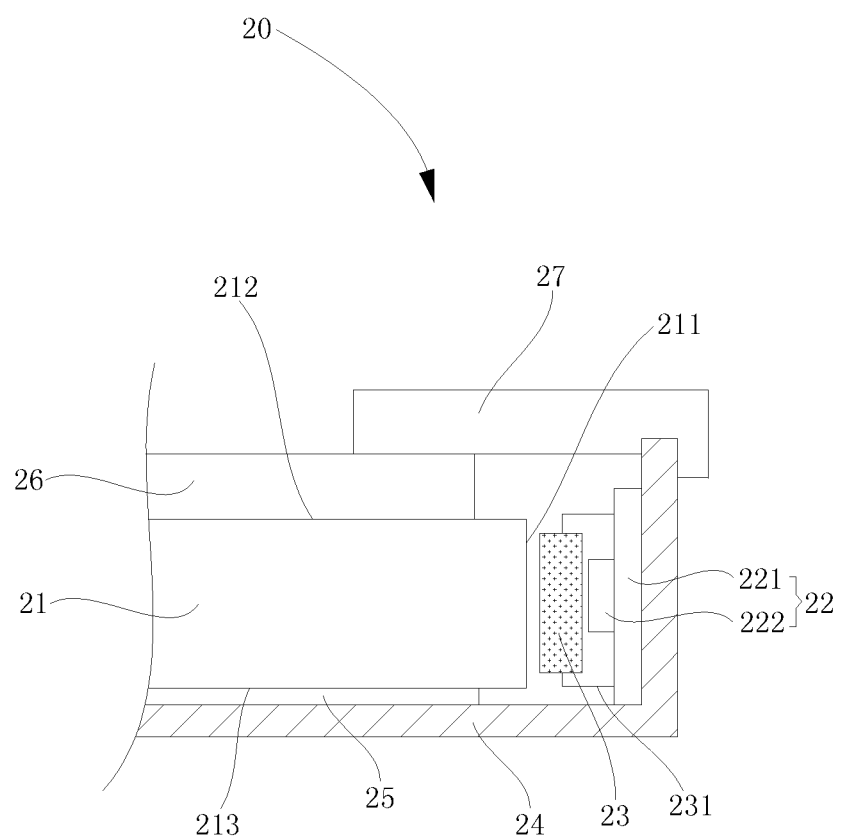
FIG. 2 is a schematic view of the backlight module in accordance with a first embodiment.

FIG. 2 is a schematic view of the backlight module in accordance with a first embodiment.

Referring to FIG. 2, in the first embodiment, the backlight module 20 includes a light guiding plate 21, a light source unit 22, a light conversion unit 23, a back plate 24, a reflective sheet 25, an optical film 26, and a plastic frame 27. In one embodiment, the light guiding plate 21 is arranged above the back plate 24. The light guiding plate 21 includes a light incident surface 211, a light emitting surface 212 connecting to the light incident surface 211, and a bottom surface 213. The light source unit 22 is arranged close to the light incident surface 211. The light conversion unit 23 is fixed between the light source unit 22 and the light incident surface 211. The light conversion unit 23 converts the light beams emitted from the light source unit 22 to white light beams. The reflective sheet 25 is arranged between the bottom surface 213 and the back plate 24 for reflecting the light beams emitted from the bottom surface 213 toward the light guiding plate 21 so as to increase the light utilization rate. The optical film 26 is arranged above the light emitting surface 212 for improving the uniformity, brightness, and the chromaticity of the light beams emitted from the light emitting surface 212. The plastic frame 27 is fixed with the plastic frame 27 so as to assemble the optical film 26, the light guiding plate 21, and the reflective sheet 25.

In one embodiment, the light source unit 22 includes the substrate 221, such as the PCB, and a plurality of LEDs 222 arranged on the substrate 221. In other words, the light source unit 22 includes the substrate 221 and the LED light bar having the plurality of LEDs 222 arranged on the substrate 221. The LEDs may be blue LEDs or purple LEDs.

In addition, the light conversion unit 23 may be a complex fluorescent material bar of quantum dots, which encapsulates a plurality of fluorescent quantum dots within transparent glasses or resin. The complex fluorescent material bar is designed with a specific length, width, and thickness, which are configured according to real scenarios. The plurality of the fluorescent quantum dots within the complex fluorescent material bar are activated, such as by the light beams emitted by the blue LEDs or purple LEDs, to emit the light beams. The light beams emitted from the fluorescent quantum dots and the blue LEDs or purple LEDs are composited to form the white light beams. Further, the composited white light beams enter the light guiding plate 21 so as to operate the backlight source of the backlight module. In addition, the fluorescent quantum dots cooperating with the blue LEDs may be fluorescent quantum dots emitting yellow or red light beams, emitting yellow light beams or emitting yellow-green light beams.

The fluorescent quantum dots cooperating with the purple LEDs may be quantum dots emitting blue light beams, mixed quantum dots emitting red light beams and emitting green light beams, or fluorescent quantum dots emitting blue or yellow light beams.

Figure 3:
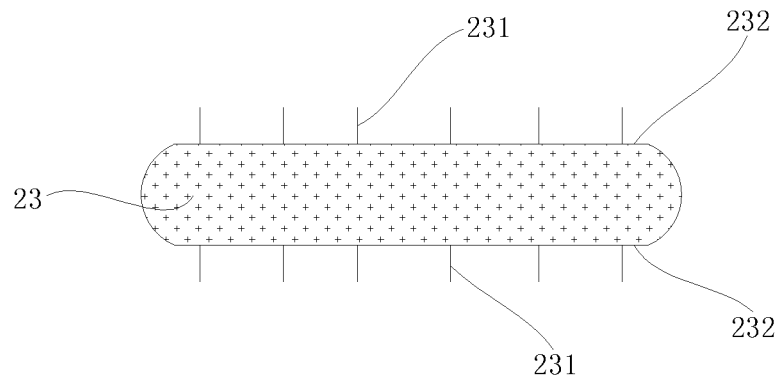
FIG. 3 is a front view of the complex fluorescent material bar of the quantum dots in accordance with the first embodiment.

In order to fix the complex fluorescent material bar, i.e., the light conversion unit 23, between the light source unit 22 and the light incident surface 211, a plurality of fixing legs 231 are arranged respectively at two lateral sides 232 along the longitudinal direction of the complex fluorescent material bar of the quantum dots as shown in FIG. 3. The fixing legs 231 may be fixedly connected with the substrate 221 of the light source unit 22 for supporting the LEDs 222 via wave soldering, i.e., SMT, so as to fix the complex fluorescent material bar of the quantum dots.

In the embodiment, the fixing process of the complex fluorescent material bar of the quantum dots is simplified. In addition, by utilizing the quantum effects, the NTSC value of the backlight module is greatly enhanced.

In the second embodiment, another fixing method is adopted to fix the complex fluorescent material bar of the quantum dots, i.e., the light conversion unit 23. It is to be noted that only the differences between the first and the second embodiment will be described hereinafter with reference to FIG. 4.

Figure 4:
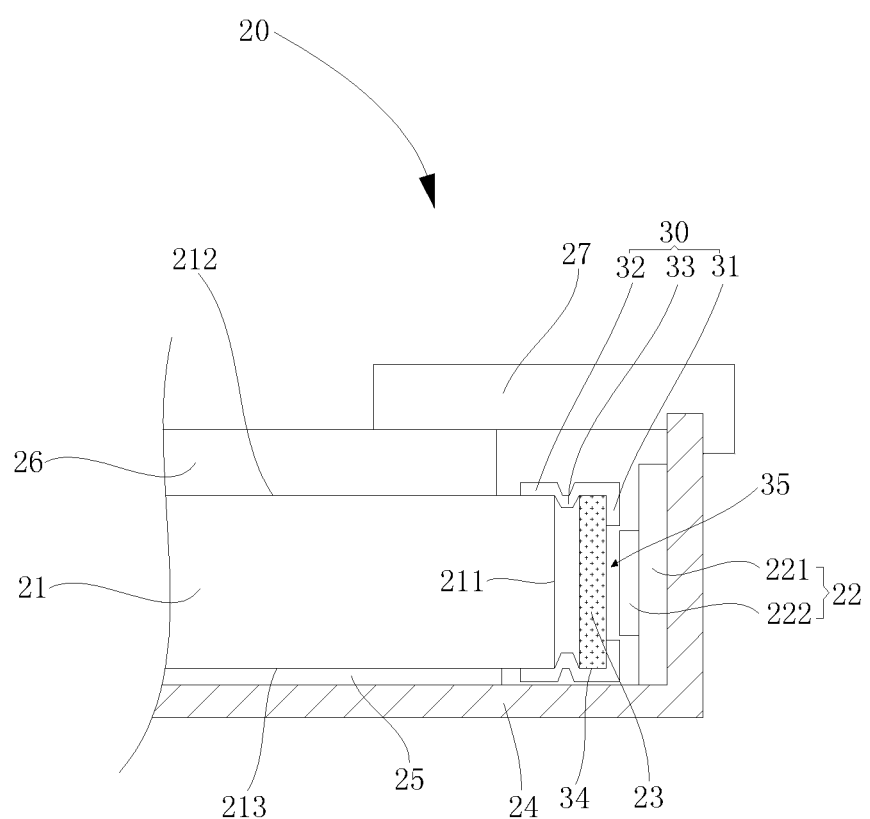
FIG. 4 is a schematic view of the backlight module in accordance with a second embodiment.

FIG. 4 is a schematic view of the backlight module in accordance with the second embodiment.

In the second embodiment, the backlight module further includes a first fixing frame 30 having a first holding sheet 31, a first connecting portion 32, and a first protrusion 33 arranged between the first holding sheet 31 and the first connecting portion 32. A first slot 34 is formed between the first protrusion 33 and the first holding sheet 31. The first connecting portion 32 may be fixedly connected with the light emitting surface 212 and the bottom surface 213 of the light guiding plate 21 by adhesive methods so as to fix the first fixing frame 30 with the light guiding plate 21. The complex fluorescent material bar of the quantum dots, i.e., the light conversion unit 23, may be arranged within the first slot 34 so as to be fixed between the light source unit 22 and the light incident surface 211 of the light guiding plate 21. In addition, a first light inlet 35 is formed between the two first holding sheets 31 such that the light beams emitting from the LED 222 pass through the first light inlet 35 and then radiate on the complex fluorescent material bar of the quantum dots.

In this way, the fixing process of the complex fluorescent material bar of the quantum dots is simplified. In addition, by utilizing the quantum effects, the NTSC value of the backlight module is greatly enhanced.

In the third embodiment, another fixing method is adopted to fix the complex fluorescent material bar of the quantum dots, i.e., the light conversion unit 23. It is to be noted that only the differences between the third and the above-mentioned embodiments will be described hereinafter with reference to FIG. 5.

Figure 5:
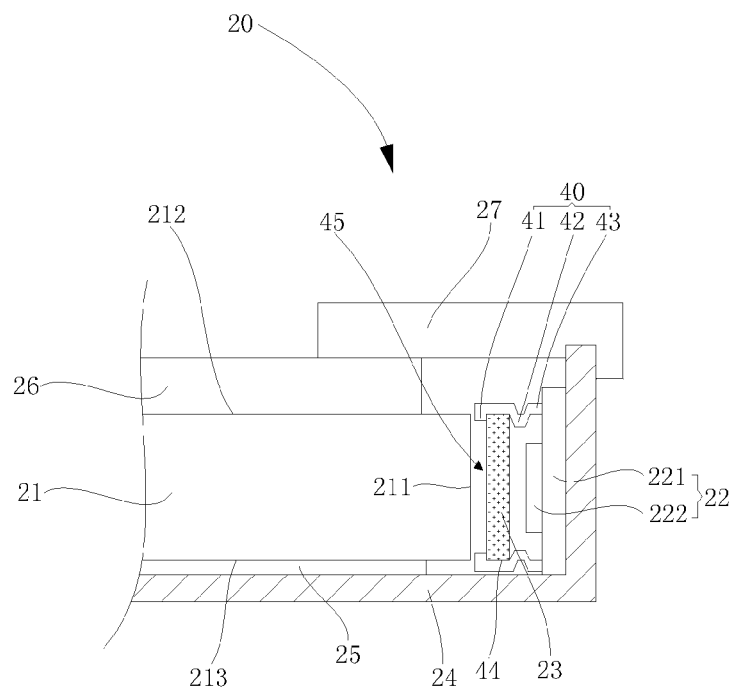
FIG. 5 is a schematic view of the backlight module in accordance with a third embodiment.

As shown in FIG. 5, the backlight module further includes a second fixing frame 40 having a second holding sheet 41, a second connecting portion 43, and a second protrusion 42 arranged between the second holding sheet 41 and the second connecting portion 43. A second slot 44 is formed between the second protrusion 42 and the second holding sheet 41. The second connecting portion 43 may be fixedly connected with the 221 substrate 221 of the light source unit 22, which is for supporting the LEDs 222, by welding so as to fix the second fixing frame 40 and the light guiding plate 21. The complex fluorescent material bar of the quantum dots, i.e., the light conversion unit 23, may be arranged within the second slot 44 so as to be fixed between the light source unit 22 and the light incident surface 211 of the light guiding plate 21. In addition, a light outlet 45 is formed between the two second holding sheets 41 such that the light beams emitting from the LED 222 and the light beams emitting from the complex fluorescent material bar are composited to generate the white light beams, and the white light beams are emitted toward the light outlet 45 of the light incident surface 211 of the light guiding plate 21. The light beams emitting from the complex fluorescent material bar are generated due to the activation of the fluorescent quantum dots by the light beams emitted from the LED 222.

In this way, the fixing process of the complex fluorescent material bar of the quantum dots is simplified. In addition, by utilizing the quantum effects, the NTSC value of the backlight module is greatly enhanced.

In the fourth embodiment, another fixing method is adopted to fix the complex fluorescent material bar of the quantum dots, i.e., the light conversion unit 23. It is to be noted that only the differences between the third and the above-mentioned embodiments will be described hereinafter with reference to FIG. 6.

Figure 6:
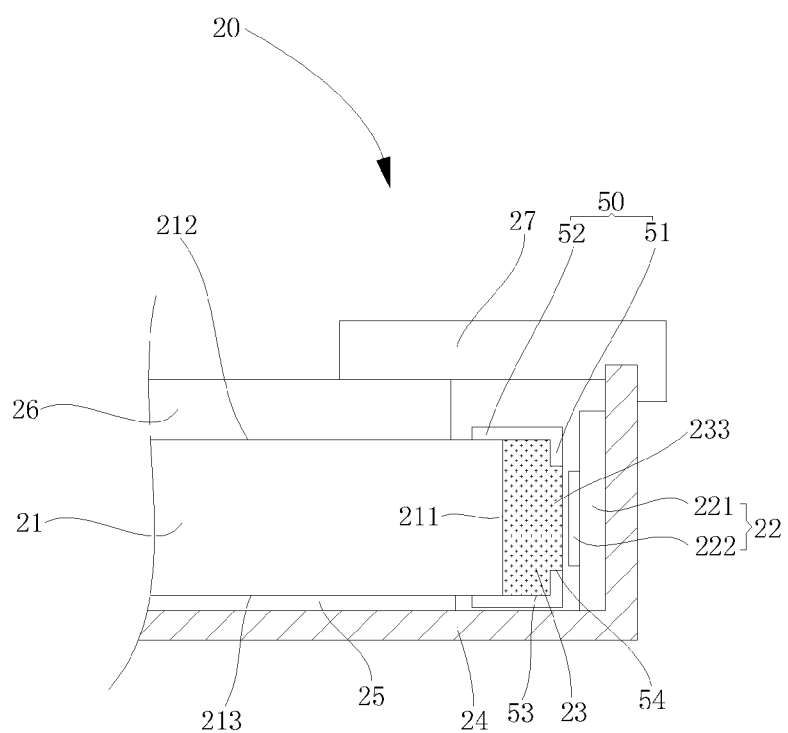
FIG. 6 is a schematic view of the backlight module in accordance with a fourth embodiment.

FIG. 6 is a schematic view of the backlight module in accordance with a fourth embodiment.

In the fourth embodiment, the backlight module further includes a third fixing frame 50. The third fixing frame 50 includes a third holding sheet 51 and a third connecting portion 52 connecting to the third holding sheet 51. The third connecting portion 52 may be fixedly connected with the light emitting surface 212 and the bottom surface 213 of the light guiding plate 21 by adhesive materials so as to fix the third fixing frame 50 with the light guiding plate 21. A third slot 53 is formed between the third holding sheet 51 and the light incident surface 211 of the light guiding plate 21. In addition, a second light inlet 54 is formed between the two third holding sheets 51 such that the light beams emitted from the LED 222 of the light source unit 22 radiate on the complex fluorescent material bar of the quantum dots. The complex fluorescent material bar of the quantum dots, i.e., the light conversion unit 23, may be arranged within the third slot 53 so as to be fixed between the light source unit 22 and the light incident surface 211 of the light guiding plate 21.

In order to enhance the fixation of the complex fluorescent material bar of the quantum dots, i.e., the light conversion unit 23, the complex fluorescent material bar of the quantum dots further includes a boss 233. When the complex fluorescent material bar of the quantum dots is arranged within the third slot 53, the boss 233 engages with the second light inlet 54 such that the complex fluorescent material bar of the quantum dots is stably fixed between the light source unit 22 and the light incident surface 211 of the light guiding plate 21.

In this way, the fixing process of the complex fluorescent material bar of the quantum dots is simplified. In addition, by utilizing the quantum effects, the NTSC value of the backlight module is greatly enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a light guiding plate comprising at least one light incident surface;
   a light source unit being arranged close to the light incident surface; and
   a light conversion unit being fixed between the light source unit and the light incident surface, and the light conversion unit converts light beams emitted from the light source unit to white light beams;
   a reflective sheet arranged between a bottom surface of the light guiding plate and a back plate for reflecting light beams emitted from a bottom surface of the light guiding plate toward the light guiding plate to increase a light utilization rate;
   wherein the light conversion unit is a complex fluorescent material bar of quantum dots comprising a plurality of fluorescent quantum dots, and light beams emitted from activated fluorescent quantum dots are composited with light beams emitted from the light conversion unit to generate white light beams; and
   wherein the complex fluorescent material bar of quantum dots comprises a plurality of fixing legs, wherein two of the fixing legs are respectively arranged on a top surface and a bottom surface of the complex fluorescent material bar, and other fixing legs are symmetrically arranged on the top surface and the bottom surface the fixing legs configured on the top surface and the bottom surface of the complex fluorescent are fixedly connected with a substrate of the light source unit to fix the complex fluorescent material bar of the quantum dots such that the complex fluorescent material bar of quantum dots is fixed between the light source unit and the light incident surface, and the substrate is parallel to the light incident surface of the light guiding plate.

2. The backlight module as claimed in claim 1, wherein the light source unit comprises a plurality of blue LEDs, and the fluorescent quantum dots cooperating with the blue LEDs are fluorescent quantum dots emitting yellow or red light beams, emitting yellow light beams or emitting yellow-green light beams.

3. The backlight module as claimed in claim 1, wherein the light source unit comprises a plurality of purple LEDs, and the fluorescent quantum dots cooperating with the purple LEDs are fluorescent quantum dots emitting blue light beams, mixed quantum dots emitting red light beams and emitting green light beams, or fluorescent quantum dots emitting blue or yellow light beams.

4. A liquid crystal device, comprising:
a liquid crystal panel and a backlight module arranged opposite to the liquid crystal panel, the backlight module provides a light source for the liquid crystal panel such that the liquid crystal panel is capable of displaying images, the backlight module comprises:
a light guiding plate comprising at least one light incident surface;
a light source unit being arranged close to the light incident surface;
a reflective sheet arranged between a bottom surface of the light guiding plate and a back plate for reflecting light beams emitted from a bottom surface of the light guiding plate toward the light guiding plate to increase a light utilization rate;
a light conversion unit being fixed between the light source unit and the light incident surface, and the light conversion unit converts light beams emitted from the light source unit to white light beams, wherein the light conversion unit is a complex fluorescent material bar of quantum dots comprising a plurality of fluorescent quantum dots, and light beams emitted from activated fluorescent quantum dots are composited with light beams emitted from the light conversion unit to generate white light beams; and
wherein the complex fluorescent material bar of quantum dots comprises a plurality of fixing legs, wherein two of the fixing legs are respectively arranged on a top surface and a bottom surface of the complex fluorescent material bar, and other fixing legs are symmetrically arranged on the top surface and the bottom surface the fixing legs configured on the top surface and the bottom surface of the complex fluorescent are fixedly connected with a substrate of the light source unit to fix the complex fluorescent material bar of the quantum dots such that the complex fluorescent material bar of quantum dots is fixed between the light source unit and the light incident surface, and the substrate is parallel to the light incident surface of the light guiding plate.

5. The liquid crystal device as claimed in claim 4, wherein the light source unit comprises a plurality of blue LEDs, and the fluorescent quantum dots cooperating with the blue LEDs are fluorescent quantum dots emitting yellow or red light beams, emitting yellow light beams or emitting yellow-green light beams.

6. The liquid crystal device as claimed in claim 4, wherein the light source unit comprises a plurality of purple LEDs, and the fluorescent quantum dots cooperating with the purple LEDs are fluorescent quantum dots emitting blue light beams, mixed quantum dots emitting red light beams and emitting green light beams, or fluorescent quantum dots emitting blue or yellow light beams.

* * * * *